United States Patent
Perina

(10) Patent No.: US 6,868,646 B1
(45) Date of Patent: Mar. 22, 2005

(54) METHOD AND MEANS FOR ERECTING A WIND ENERGY TOWER

(75) Inventor: Mark J. Perina, Omaha, NE (US)

(73) Assignee: Valmont Industries, Inc., Valley, ME (US)

( * ) Notice: Subject to any disclaimer, the term of this patent is extended or adjusted under 35 U.S.C. 154(b) by 292 days.

(21) Appl. No.: 10/319,166

(22) Filed: Dec. 13, 2002

(51) Int. Cl.[7] .............................................. E04H 12/34
(52) U.S. Cl. ................ 52/745.17; 52/749.1; 52/745.18
(58) Field of Search ........................... 62/749.1, 745.17, 62/745.18, 122.1, 123.1; 425/65, 64; 264/33; 212/176

(56) References Cited

U.S. PATENT DOCUMENTS

| | | | | |
|---|---|---|---|---|
| 3,252,199 A | * | 5/1966 | Bossner | 425/65 |
| 3,354,599 A | * | 11/1967 | Martin | 52/745.17 |
| 3,628,223 A | * | 12/1971 | Babee | 425/65 |
| 4,125,193 A | * | 11/1978 | Matsumoto | 212/203 |
| 4,920,710 A | * | 5/1990 | Paine | 52/108 |
| 5,263,835 A | * | 11/1993 | Schmidt | 425/64 |
| 5,794,387 A | * | 8/1998 | Crookham | 52/122.1 |

* cited by examiner

Primary Examiner—Brian E. Glessner
Assistant Examiner—Basil Katcheves
(74) Attorney, Agent, or Firm—Thomte, Mazour & Niebergall; Dennis L. Thomte

(57) ABSTRACT

A wind energy tower erection device is disclosed together with the method of assembling the same and the method of utilizing the device to erect a wind energy tower. The tower erection device successively places tower sections one upon the other until the tower is erected.

25 Claims, 19 Drawing Sheets

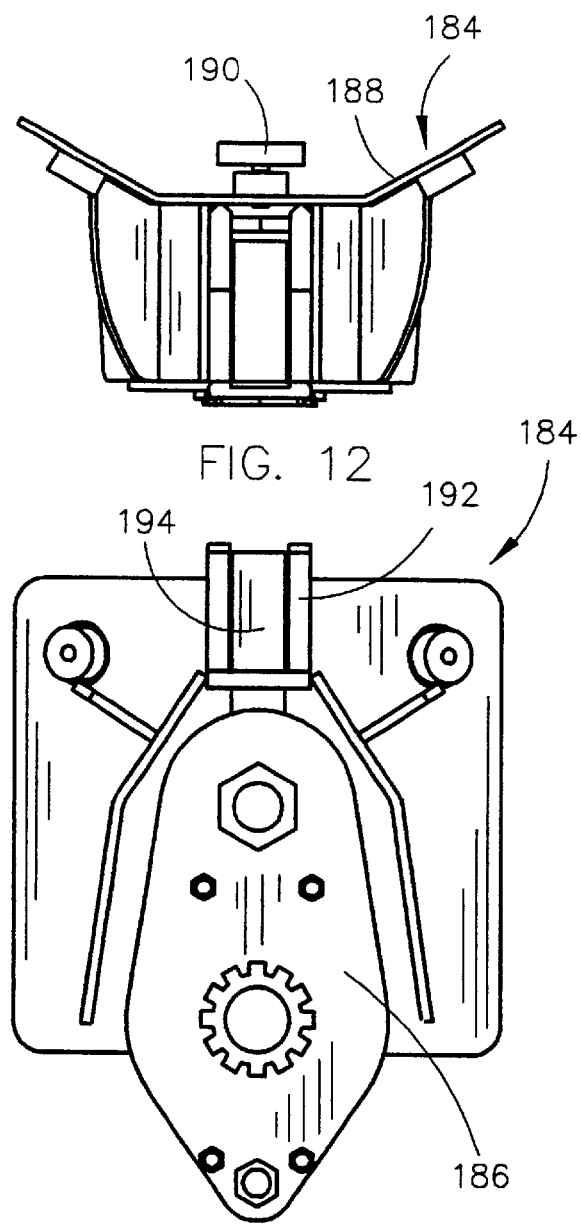
FIG. 12
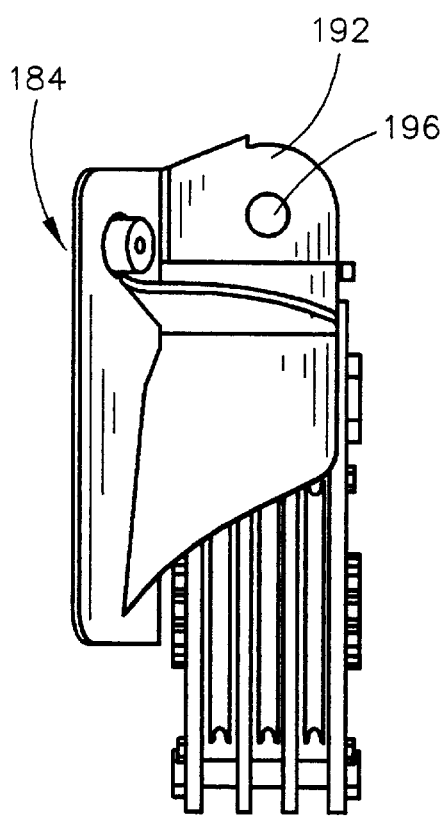
FIG. 13
FIG. 14
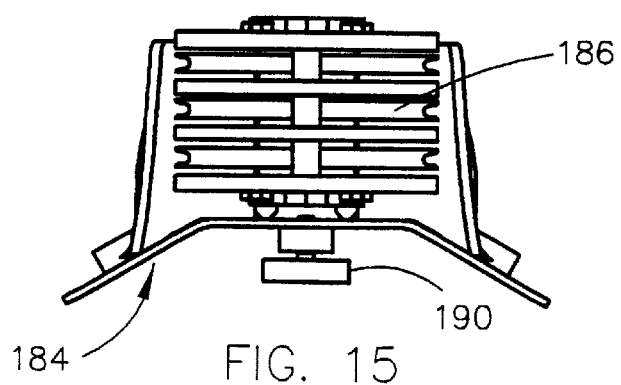
FIG. 15

METHOD AND MEANS FOR ERECTING A WIND ENERGY TOWER

BACKGROUND OF THE INVENTION

1. Field of the Invention

This invention relates to a method and means for erecting a tower and more particularly to a method and means for erecting a wind energy tower wherein tower sections are successively placed upon one another.

2. Description of the Related Art

Wind turbines or wind energy devices are becoming more popular in the production of electrical energy. The wind turbine or wind energy device normally comprises a rotor-driven generator mounted atop a tower which may reach heights of 70 meters or more. The tower is usually comprised of a plurality of tapered or cylindrical tower sections which are secured together in an end-to-end relationship. The tower is normally erected by the use of a large crane. When the tower has been erected, the large crane lifts the turbine onto the top of the tower. The customary method of erecting the tower is quite expensive due to the requirement that the large crane must be present on the job site. Further, in some windy conditions, the lifting of the tower sections by the large crane is hazardous.

SUMMARY OF THE INVENTION

A wind energy tower erecting device is provided for successively erecting tower sections upon a base tower section which extends upwardly from a foundation and which is secured thereto. Normally, the base tower section will be positioned upon the foundation with a small crane. The tower erecting device comprises a skid or skid module upon which is positioned a power source such as an engine, a main winch having a hoisting cable extending therefrom, and a tower section staging platform upon which individual tower sections are successively positioned for erection on the base tower section. The skid module is positioned adjacent the base tower section and is anchored to the foundation by a plurality of bolts.

A jack stand is placed adjacent the base tower section and extends partially therearound. A lower cage is initially positioned on the upper end of the jack stand and extends at least partially around the base tower section. A lower block is secured to the lower cage. The lower cage includes roll bank assemblies mounted thereon which are adapted to engage rails on opposite sides of the tower sections to enable the lower cage and associated structure to be selectively vertically moved on the tower sections. An upper cage is spaced above the lower cage and is interconnected thereto by a supporting frame structure which is comprised of spaced-apart side panels and spaced-apart side trusses.

An upper block is initially removably attached to the base tower section adjacent the upper end thereof and is adapted to be successively attached to the upper ends of the tower sections as they are placed upon the base tower section. The hoisting cable from the main winch extends around the upper and lower blocks in a multi-parted fashion with the free end thereof being secured to the lower block. A bridge assembly is positioned on the upper end of the upper cage and comprises a bridge, trolley and Z-slide. The bridge is a trapezoidal-shaped beam which straddles or bridges the upper end of the upper cage and moves in the Y direction (front to back). The trolley moves with respect to the bridge in the X direction (side to side). The Z-slide is mounted on the trolley and moves in the Z direction (vertical). A tower section connector or load toggle is connected to the Z-slide at the lower end thereof and is comprised of a double gimble-type joint and a load spider. The load spider includes four rotating load arms which are selectively attached to the flange on the upper end of the tower section being transported. An auxiliary power unit is mounted on the bridge assembly for providing power for the bridge assembly and miscellaneous electrical equipment. An auxiliary winch is also positioned on the Z-slide.

The wind energy tower is erected as follows: (1) a small crane is utilized to place the base tower section on the foundation and is bolted into place; (2) the jack stand is positioned around the base tower section; (3) the skid module is moved into place and bolted to the foundation; (4) the roll bank assemblies on the lower cage are opened; (5) the lower cage is lifted onto the jack stand; (6) the roll bank assemblies are moved into an operative engagement position with respect to the rails on the opposite sides of the base tower section; (7) the side panels and side trusses are assembled; (8) one side panel-side truss is secured to one side of the lower cage so as to extend upwardly therefrom; (9) the other side panel-side truss is secured to the other side of the lower cage so as to extend upwardly therefrom; (10) the upper cage is mounted on the upper ends of the side panels by means of a small crane; (11) the upper block is secured to the side of the base tower section at the upper end thereof; (12) the hoisting cable is extended from the main winch on the skid module and connected to the lower block on the lower cage and upper block on the upper end of the base tower section whereby movement of the hoisting cable by the main winch causes the lower cage and the structure supported thereby to be moved vertically with respect to the base tower section; (13) another tower section is placed or staged on the staging platform provided on the skid module; (14) the bridge assembly is manipulated on the upper cage to position the load toggle on the Z-slide within the upper end of the tower section on the staging platform; (15) the load toggle is secured to the flange on the staged tower section; (16) the main winch is operated to cause the hoisting cable to raise the lower cage, upper cage, interconnecting supporting frame structure, bridge assembly and the staged tower section upwardly with respect to the base tower section; (17) when the staged tower section is raised sufficiently, the lower cage is pinned to the rails on the base tower section; (18) the bridge assembly is manipulated so that the staged tower section is positioned over the base tower section and then lowered onto the base tower section; (19) the flange on the lower end of the staged tower section is bolted to the flange on the upper end of the base tower section; (20) the auxiliary winch on the bridge assembly is operated to raise the upper block from the upper end of the base tower section, after it has been disconnected from the base tower section, to the upper end of the staged tower section mounted thereon; (21) the upper block is secured to the staged tower section mounted on the base tower section; (22) the lower cage is unpinned from the rails and is moved downwardly until the lower cage rests upon the jack stand; (23) the bridge assembly is manipulated to position the load toggle within the upper end of another tower section on the staging platform; (24) repeating the necessary steps described above until the wind energy tower is completely erected; (25) using the auxiliary winch to lower the upper block to the ground after it has been removed from the erected tower; (26) removing the bridge assembly, upper cage, side panels and side trusses, lower cage and jack stand from the erected tower; and (27) removing the skid module from the foundation.

It is therefore a principal object of the invention to provide an improved wind energy tower erection device.

A further object of the invention is to provide an improved wind energy tower erection device which eliminates the need for a large crane such as is customarily required.

Yet another object of the invention is to provide an improved wind energy tower erection device which may be used to erect towers having a height which exceeds the reach of even a very large crane.

Still another object of the invention is to provide an improved wind energy tower erection device which is safe to use in practically all weather conditions.

Still another object of the invention is to provide an improved wind energy tower erection device which is durable and reliable.

These and other objects will be apparent to those skilled in the art.

BRIEF DESCRIPTION OF THE DRAWINGS

FIG. 12 is a top view of the upper block attachment hanger and upper block;

FIG. 13 is a side view of the upper block attachment hanger and upper block;

FIG. 14 is a front view of the upper block attachment hanger and upper block;

FIG. 15 is a bottom view of the upper block attachment hanger and upper block;

DESCRIPTION OF THE PREFERRED EMBODIMENT

Figure 1:
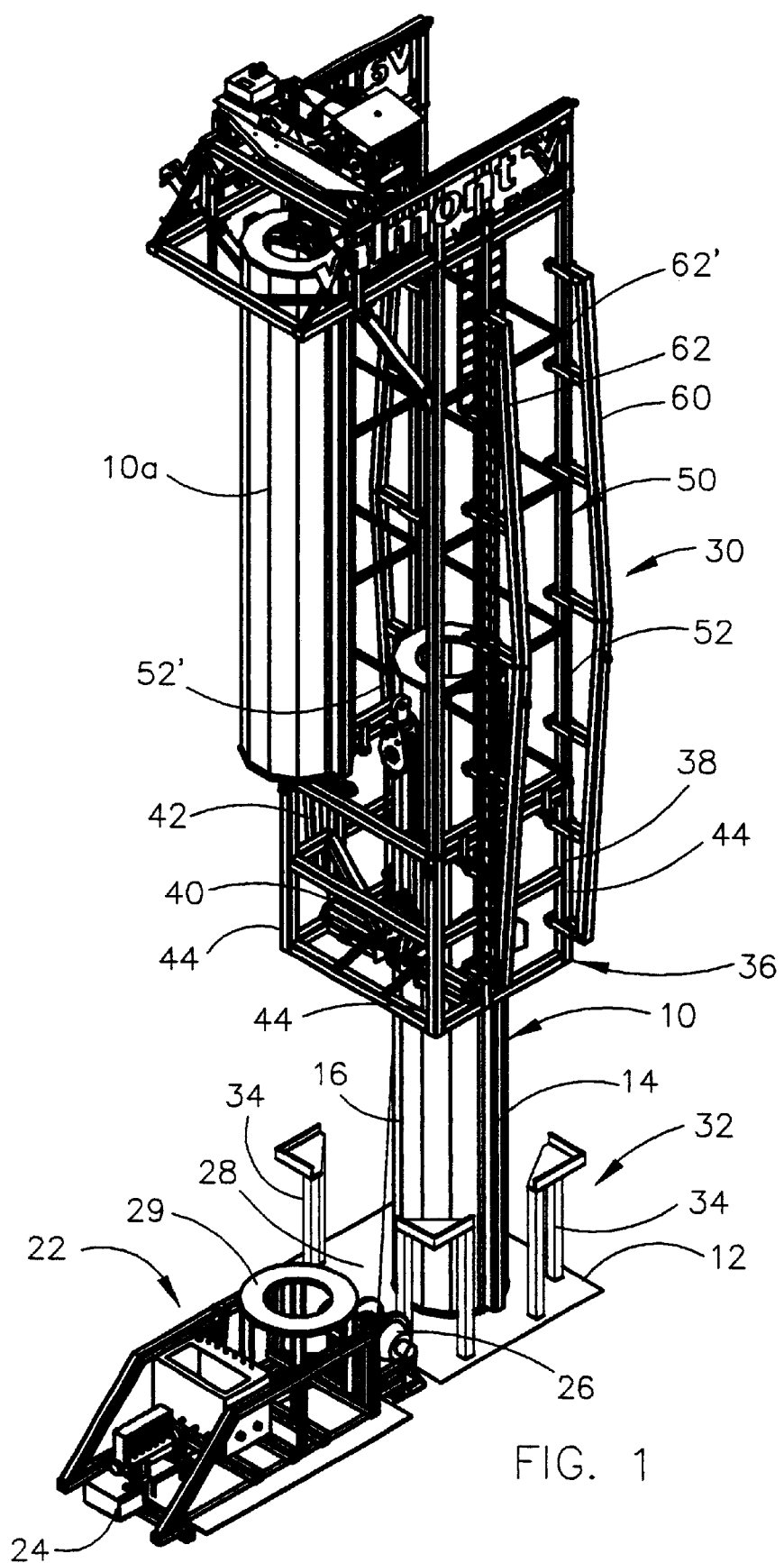
FIG. 1 is a perspective view of the apparatus for erecting a wind energy tower.
Figure 2:
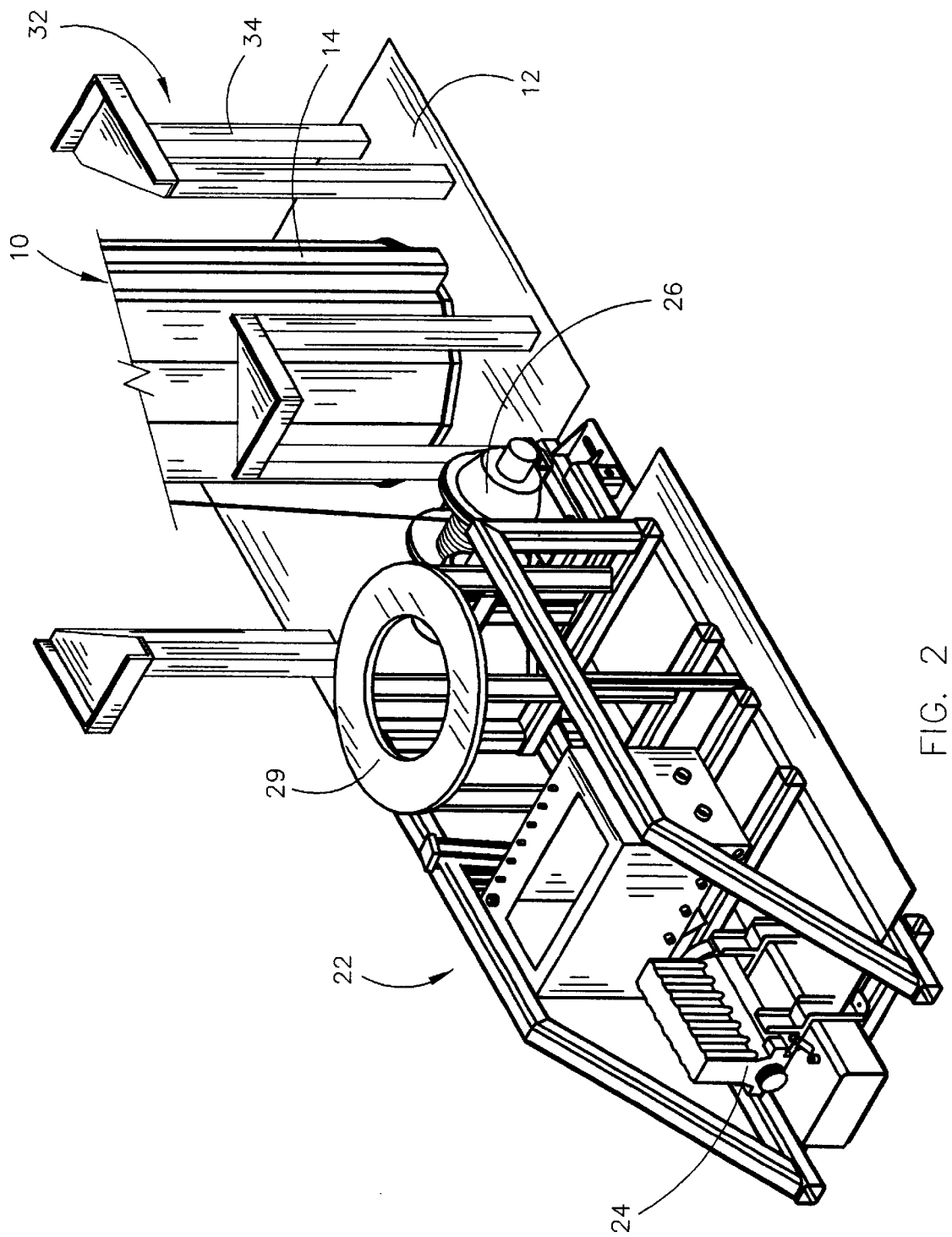
FIG. 2 is a perspective view of the skid module portion of the apparatus.

Referring to the drawings, the numeral 10 refers to a base tower section of the wind energy tower to be erected. The base tower section 10 will normally be positioned on a concrete foundation 12 by a small crane (not shown). The base tower section 10 is bolted to the foundation 12 in a conventional fashion. The base tower section 10 includes a pair of longitudinally extending rails 14 and 16 secured to the opposite sides thereof with each of the rails having vertically spaced-apart openings 18 formed therein, each of which is adapted to receive a pin 20 therein as will be described in more detail hereinafter.

Normally, the small crane will be used to mount a single base tower section on the foundation, but one or more tower sections of the tower could be mounted on the base tower section through the use of the small crane. The invention herein will be described as if a single base tower section is erected through the use of the small crane with the other tower sections of the tower being erected through the use of the apparatus of this invention.

The numeral 22 refers to a skid or skid module which is comprised of a tubular framework which is bolted to the foundation 12. Skid 22 includes a power unit 24 and a main winch 26 having a hoisting cable 28 extending therefrom. If desired, an auxiliary winch may be mounted on the skid 22 for lowering a top block to the ground at the end of a work day. Preferably, the main winch is hydraulically driven by a suitable hydraulic pump on the skid 22 which is driven by the power unit. However, the main winch 26 could be mechanically driven by the power unit if so desired. Power unit 24 is preferably a diesel engine but could be a gas engine or an electric motor. Preferably, the main winch, and associated equipment, are remotely controllable. A tower staging platform 29 is provided on skid 22 for successively supporting the tower sections thereon.

For ease of description, the numeral 30 will refer to the apparatus which is actually movably mounted on the tower. Apparatus 30 is initially positioned on a jack stand assembly 32 which is comprised of four upstanding jack stands 34, the lower ends of which are positioned on the foundation. The upper ends of the jack stands 34 are preferably positioned approximately sixty inches above the foundation 12. It is recommended that the jack stands 34 be chained together to prevent the tipping thereof.

Apparatus 30 includes a lower cage 36 which is three-sided to enable the lower cage 36 to be positioned around the base tower section 30, and the other tower sections as well. For purposes of description, lower cage 36 will be described as including sides 38, 40 and 42, each of which are comprised of a tubular framework welded together. Lower cage 36 includes four hollow, vertically disposed corner posts or legs 44. The lower end of lower cage 36 is normally supported upon the jack stand assembly 32. The lower end of lower block 46 is pivotally secured to lower cage 36 by a clevis and pin structure 48. Lower cage 36 includes a pair of roll bank assemblies 49 mounted thereon on opposite sides thereof for engagement with the rails 14 and 16 on the opposite sides of the tower section.

Figure 3:
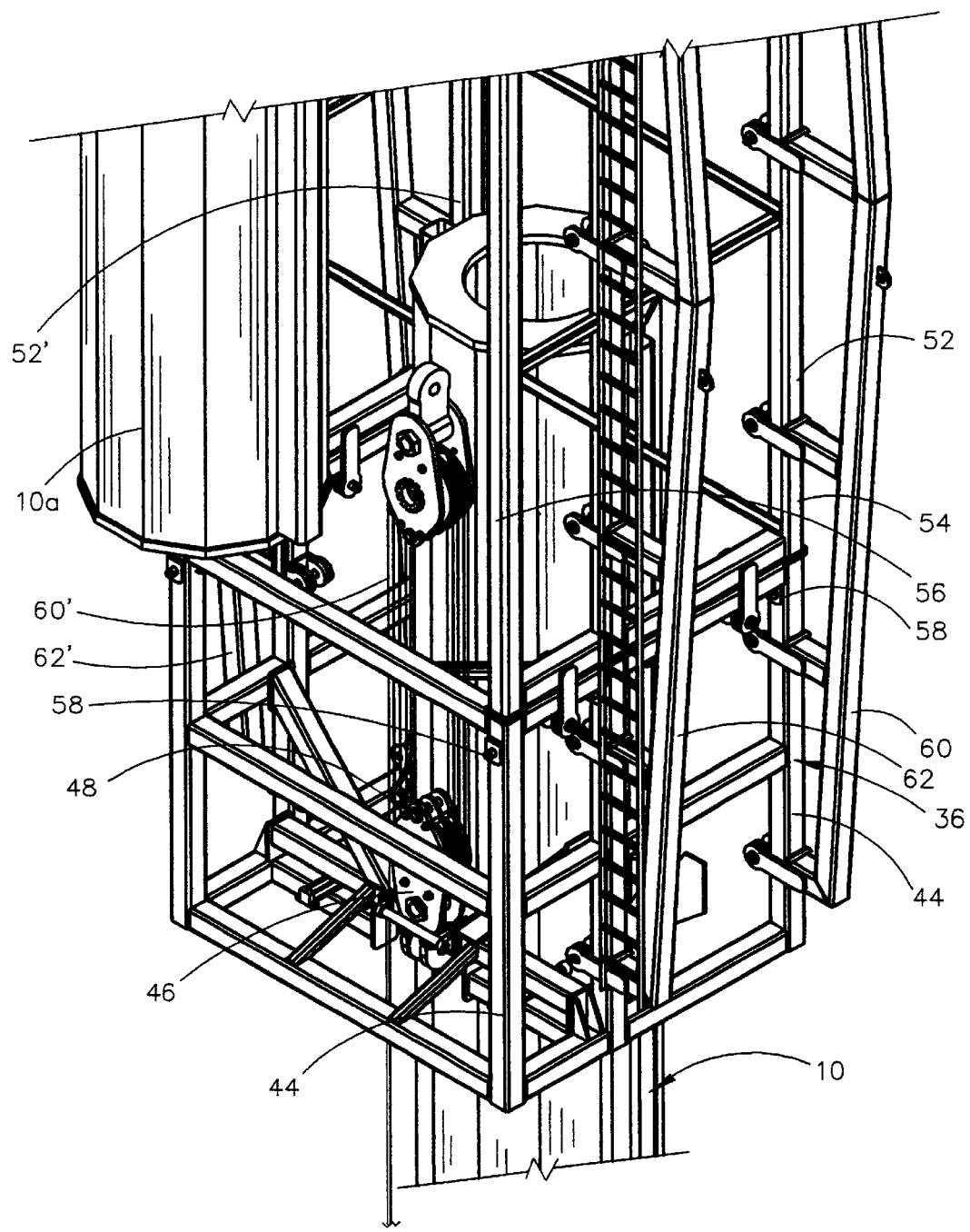
FIG. 3 is a partial perspective view of the lower end of the apparatus.
Figure 4:
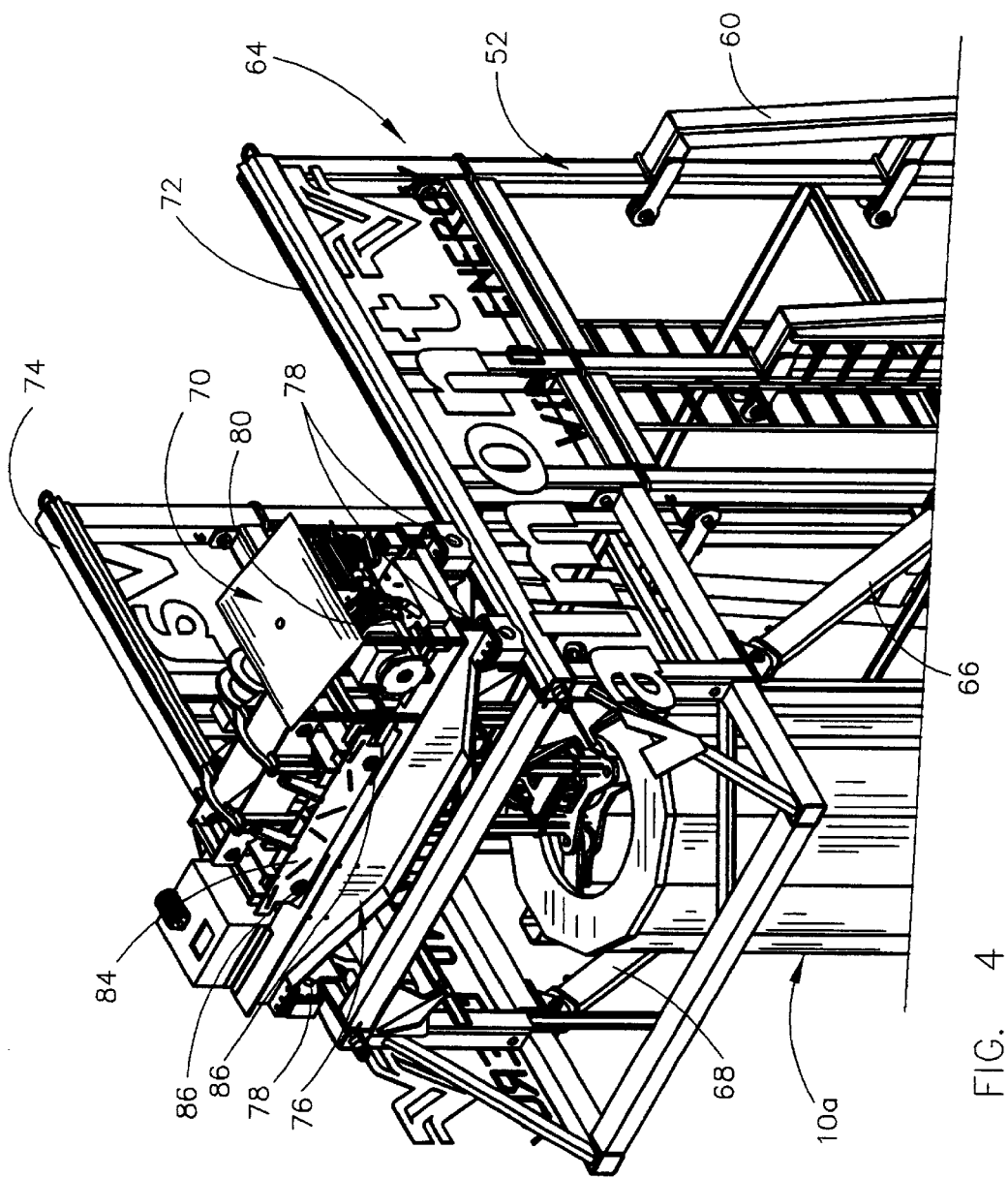
FIG. 4 is a partial perspective view of the upper end of the apparatus illustrating the upper cage and bridge assembly.
Figure 5:
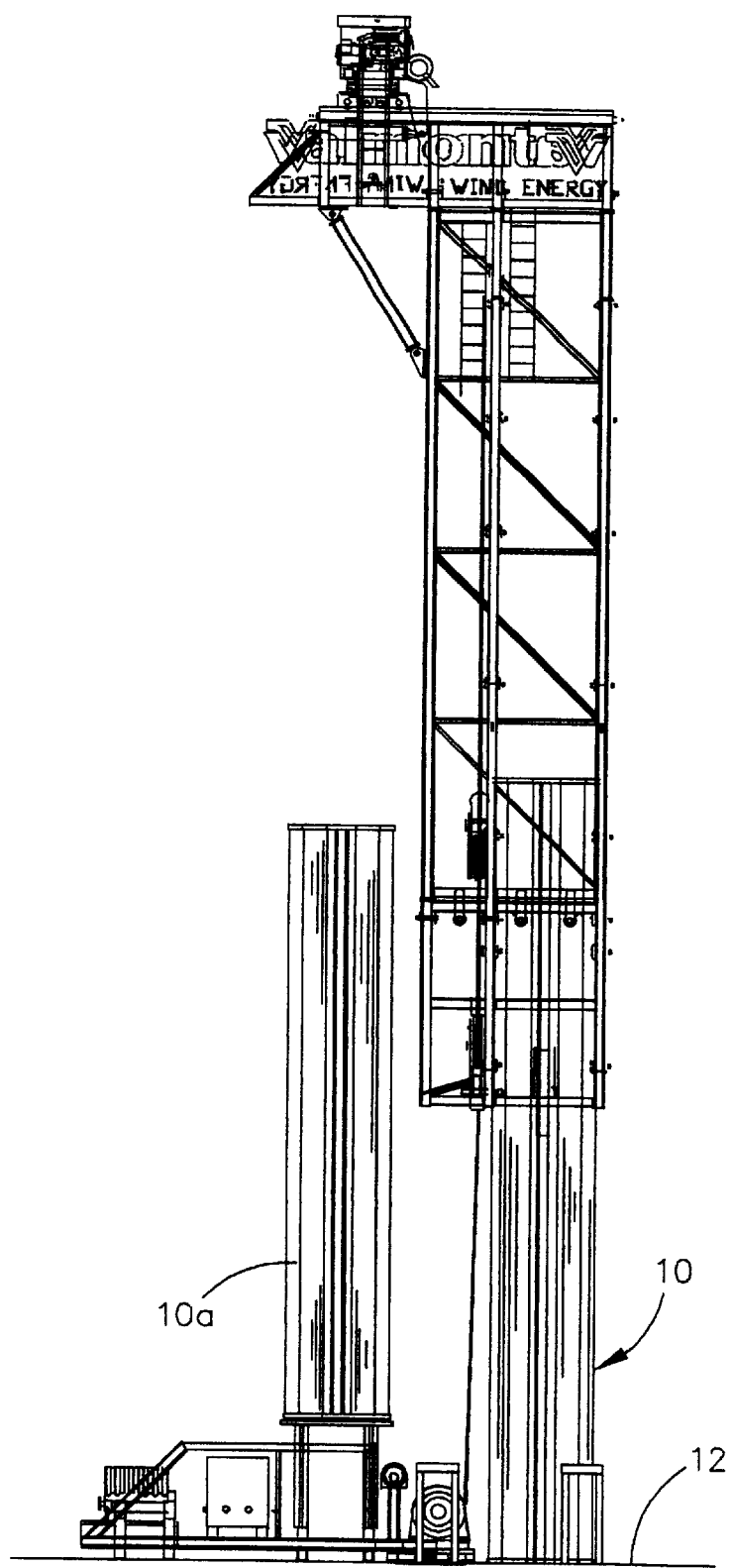
FIG. 5 is a side view of the apparatus illustrating the lower cage, etc., its uppermost position with respect to the tower base section.
Figure 6:
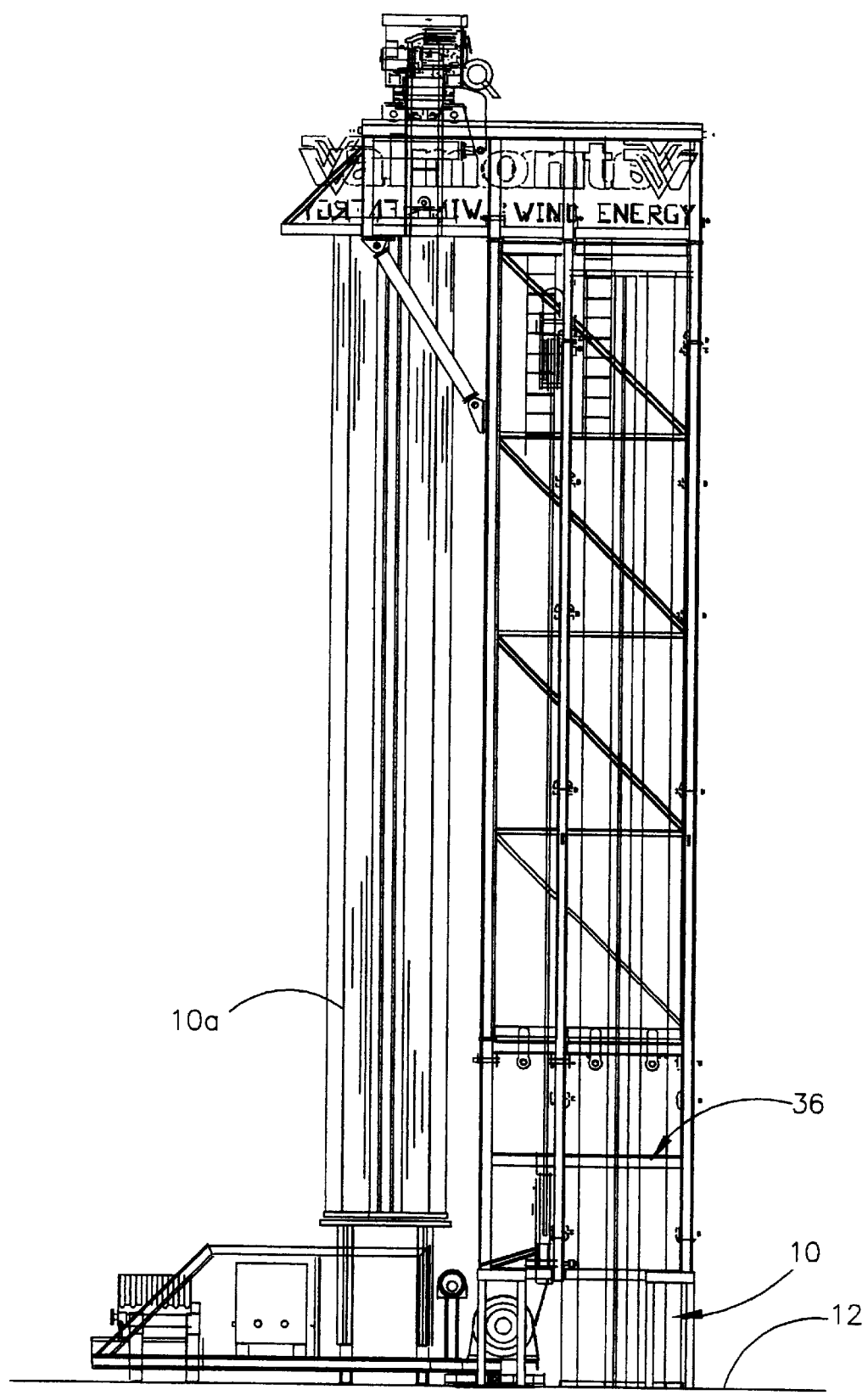
FIG. 6 is a side view of the apparatus illustrating the lower cage, etc., in its lowermost position supported upon the jack stand.
Figure 7:
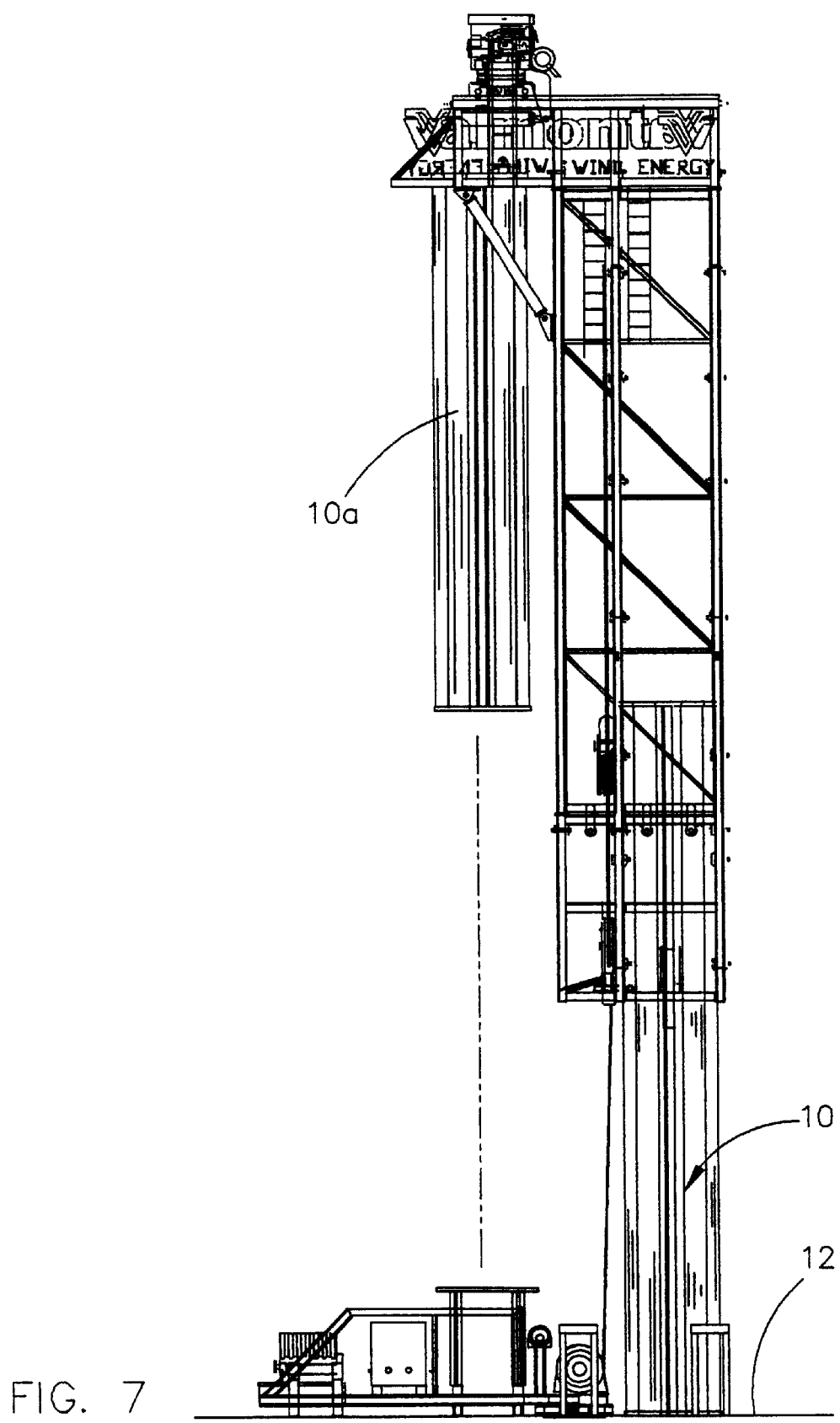
FIG. 7 is a side view of the apparatus illustrating the lower cage, etc., in its uppermost position with a tower section having been lifted from the staging platform for positioning on the base tower section.
Figure 8:
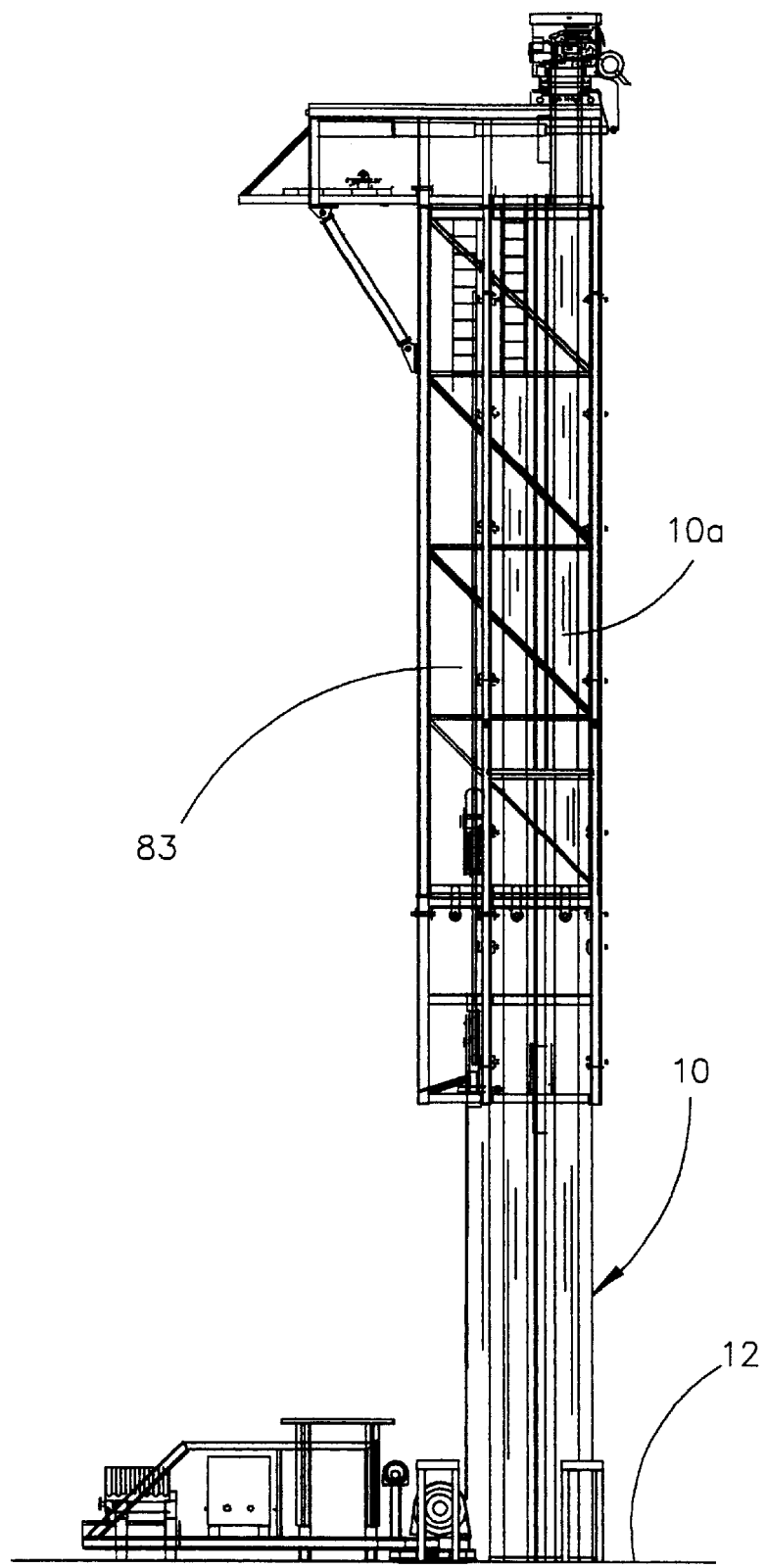
FIG. 8 is a view similar to FIG. 7 except that the bridge assembly has moved the staged tower section to a position over the base tower section.
Figure 9:
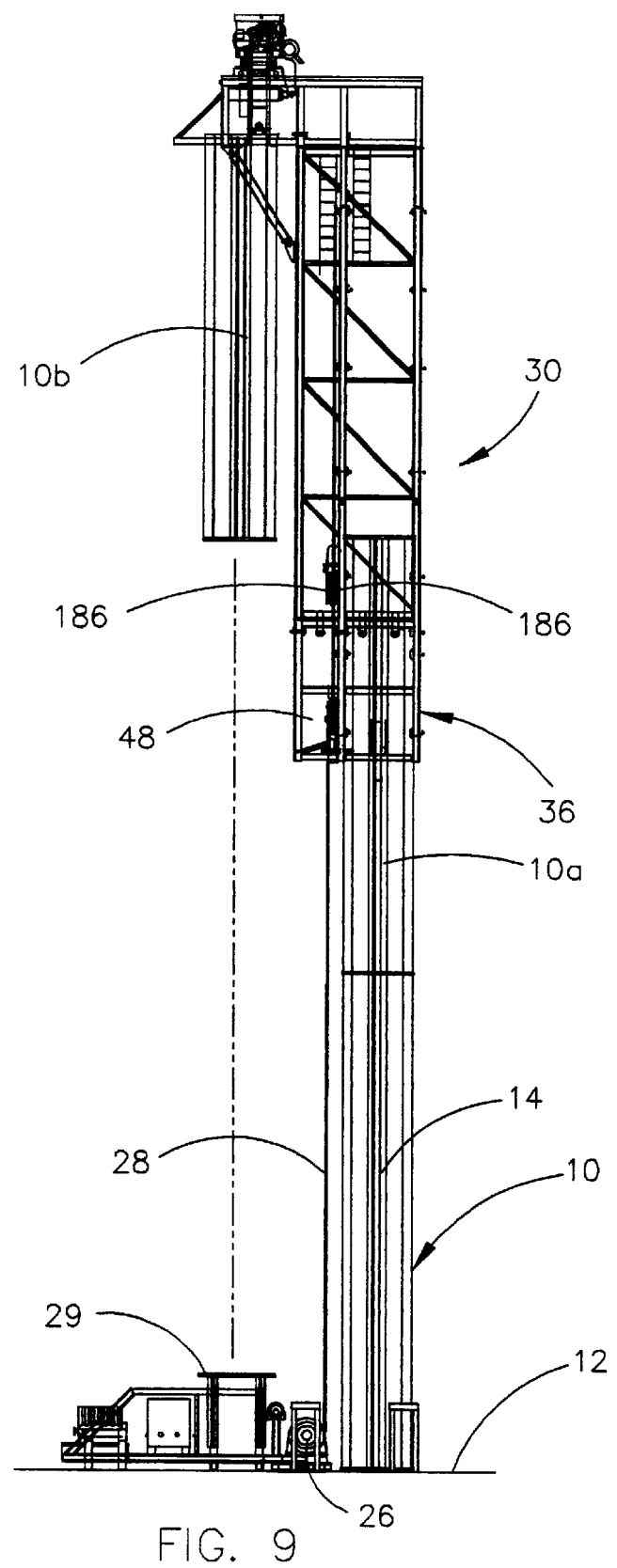
FIG. 9 is a side view similar to FIG. 8 which illustrates another tower section having been raised from the staging platform.
Figure 10:
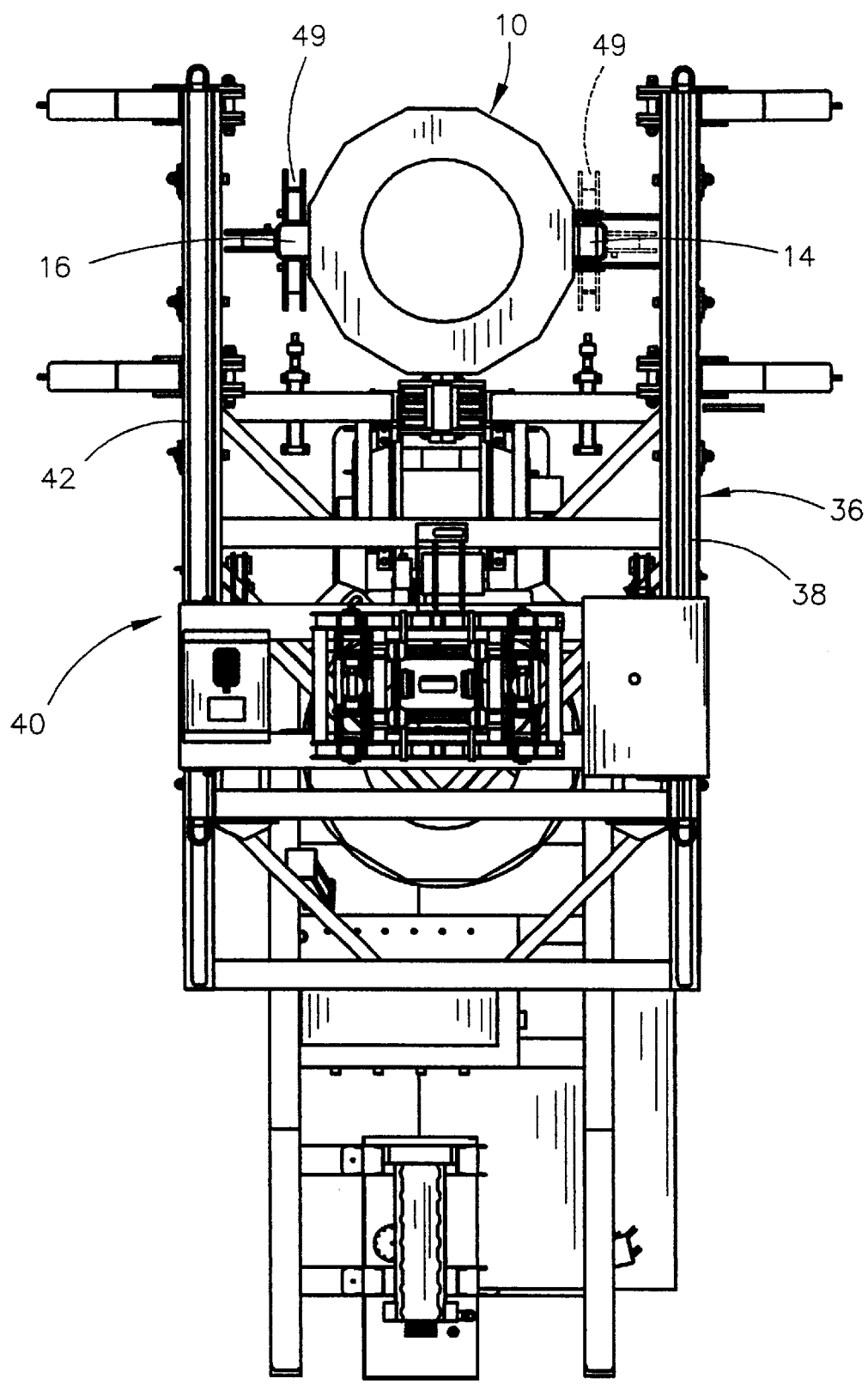
FIG. 10 is a top view of the apparatus.
Figure 11:
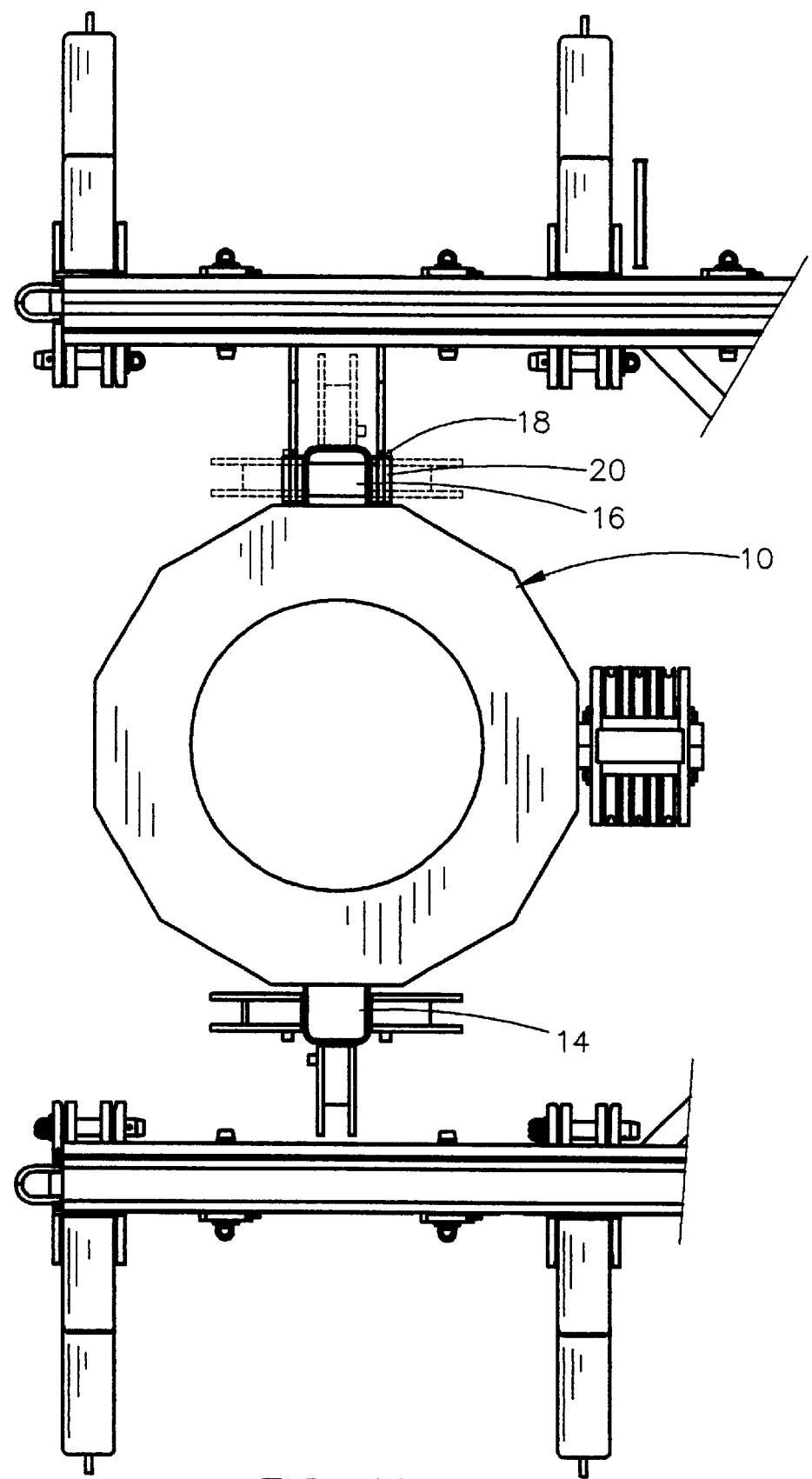
FIG. 11 is a top view illustrating the relationship of the lower cage with respect to the rails of a tower section.
Figure 16:
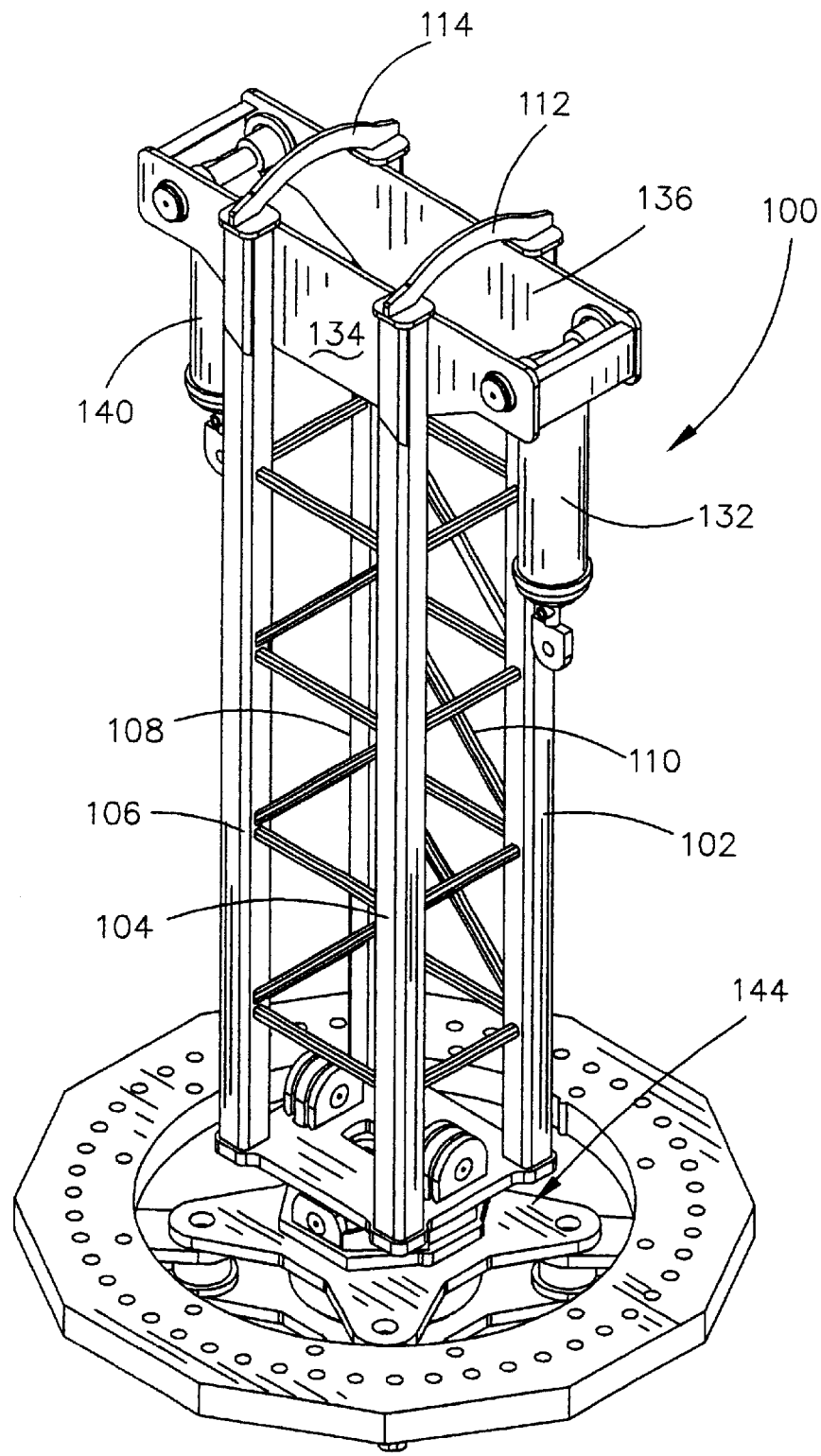
FIG. 16 is a perspective view of the Z-slide and load toggle and their relationship to the top flange on a tower section.
Figure 17:
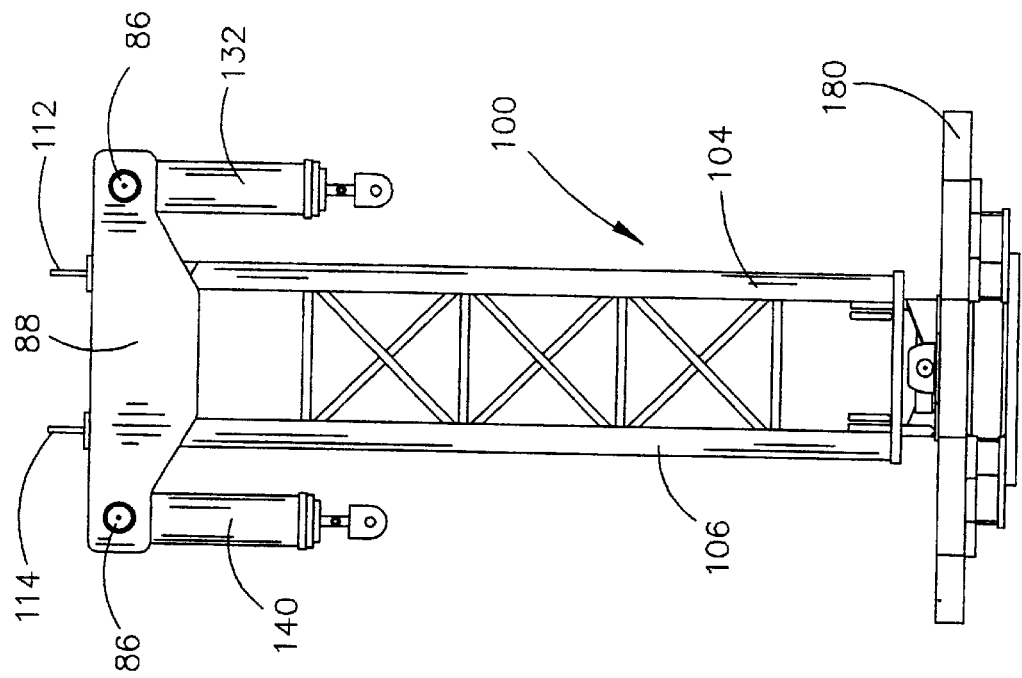
FIG. 17 is a front view of the Z-slide and load toggle and their relationship to the top flange on a tower section.
Figure 18:
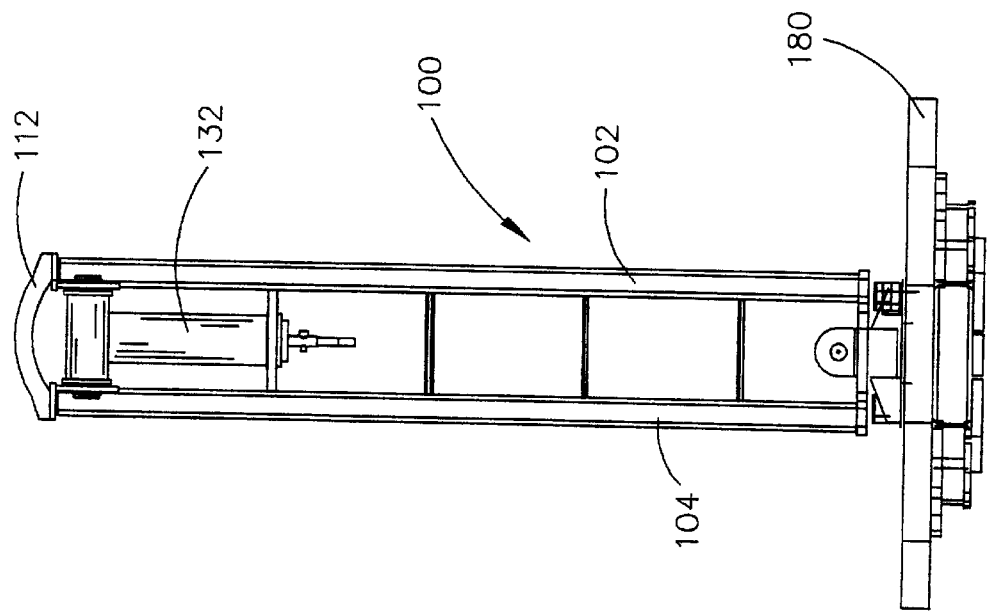
FIG. 18 is a side view of the Z-slide and load toggle and their relationship to the top flange on a tower section.

An interconnecting frame assembly or frame structure 50 is selectively secured to lower cage 36 and extends upwardly therefrom. Frame assembly 50 includes side panel 52 which has the lower ends of posts or legs 54 and 56 received within the upper ends of a pair of corner posts 44 and secured thereto by pins 58 (FIG. 3). Frame assembly 50 also includes side panel 52' which is identical to side panel 52 and which extends upwardly from side 42 of lower cage 36. Interconnecting frame assembly 50 also includes side trusses 60 and 62 which are removably secured to lower cage 36 and side panel 52 to add strength and stability to the assembly 50. Side trusses 60' and 62', which are identical to side trusses 60 and 62, are removably secured to lower cage 36 and side panel 52' to add strength and stability to the assembly 50.

Upper cage 64 is selectively removably mounted on the upper end of side panels 52 and 52' of interconnecting frame assembly 50. As seen in the drawings, one end of upper cage 64 protrudes laterally of the frame assembly 50. The laterally protruding portion of upper cage 64 is supported by a pair of support arms 66 and 68, the lower ends of which are connected to side panels 52 and 52', respectively.

The numeral 70 refers to a bridge assembly mounted on rails 72 and 74 of upper cage 64. Bridge assembly 70 includes a bridge 76 which comprises a pair of spaced-apart trapezoidal-shaped beams that straddle or bridge and rides atop the rails 72 and 74 of upper cage 64 and moves in the Y direction (front to back). Bridge 76 includes four rollers 78 which roll upon the rails 72 and 74. A pair of hydraulic cylinders (not shown) are secured to and extend between upper cage 64 and bridge 76 for moving bridge 76 in the Y direction. Upper power unit 80 preferably consists of a 24 kw diesel generator set and a 15 hp electric pressure-compensated hydraulic pump. Unit 80 provides power for the bridge assembly 70 and can power miscellaneous electrical equipment. An auxiliary winch 82 is mounted on bridge 76 and has a cable 83 extending therefrom.

Figure 19:
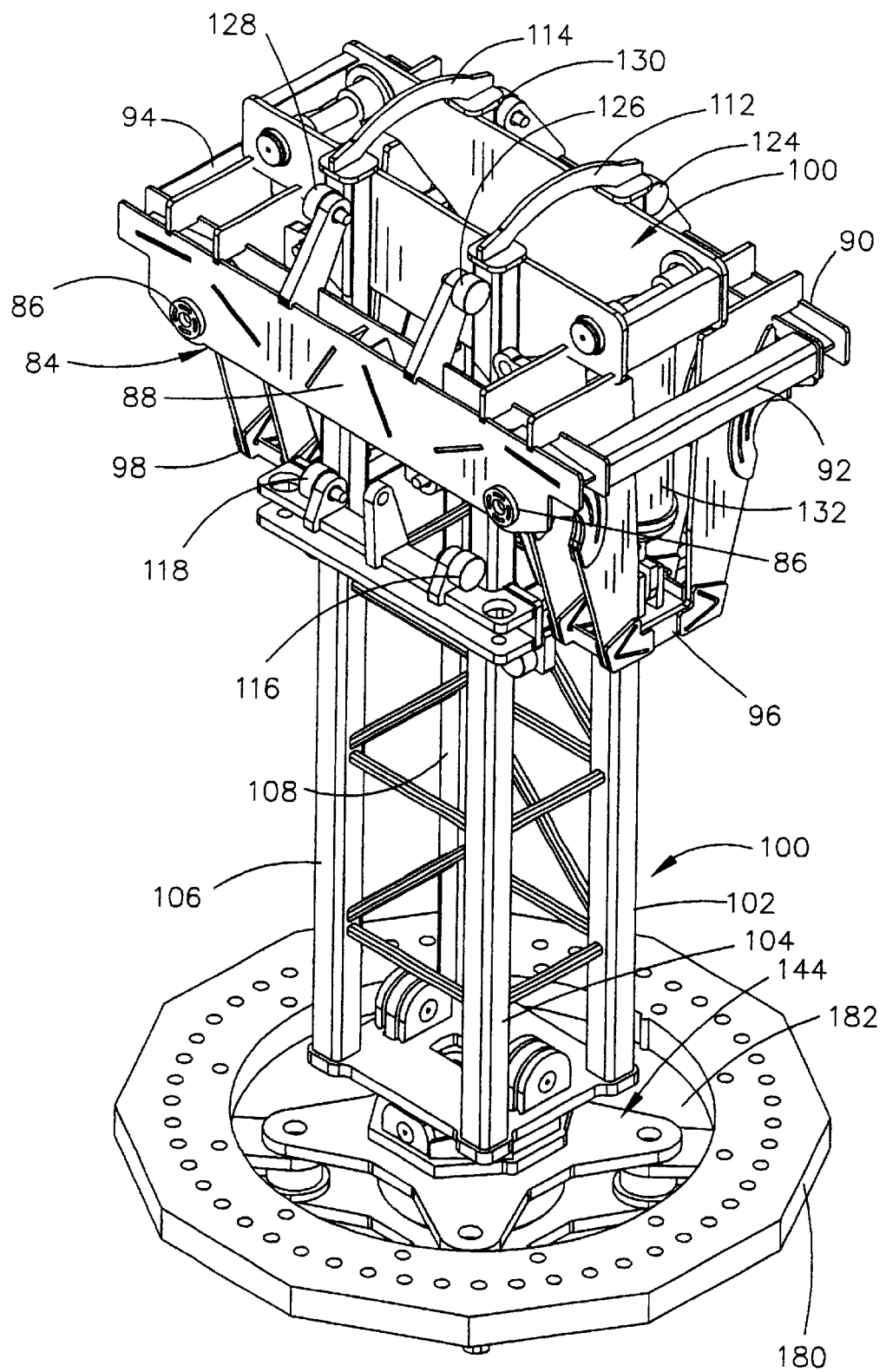
FIG. 19 is a perspective view similar to FIG. 16 except that the Z-slide is shown mounted on the trolley.
Figure 20:
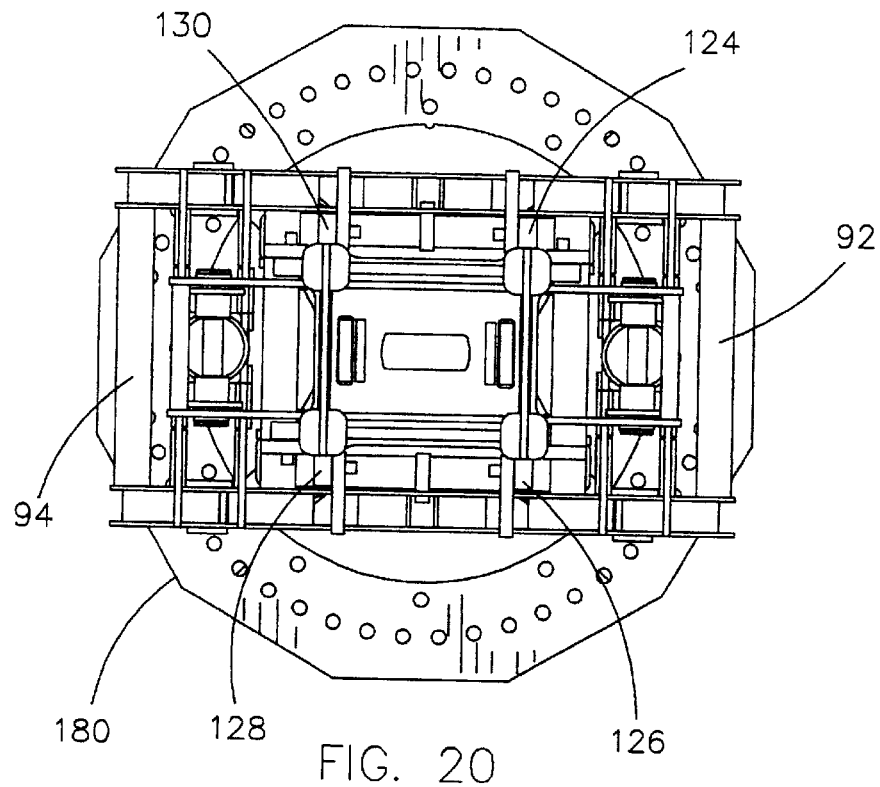
FIG. 20 is a top view of the Z-slide, trolley and load toggle of FIG. 19.
Figure 21:
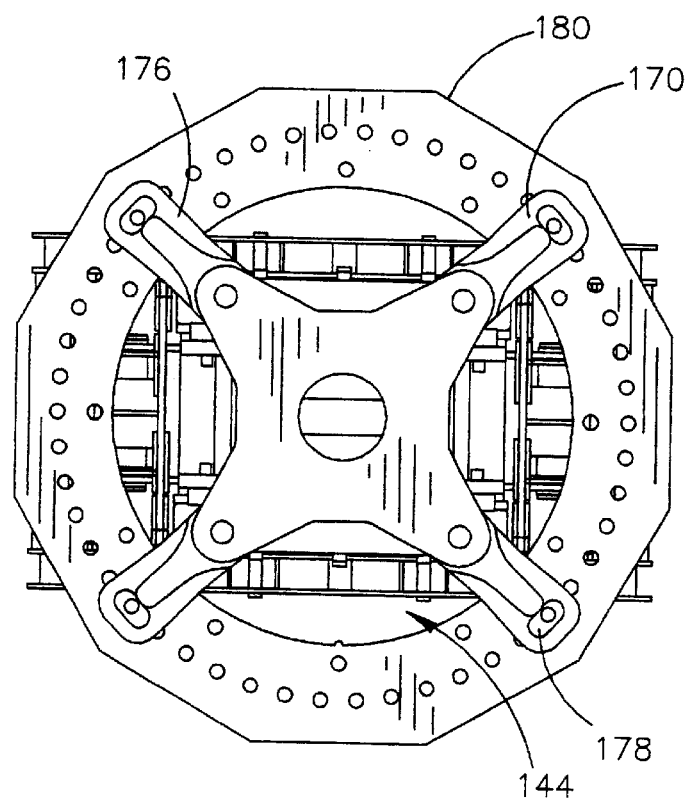
FIG. 21 is a bottom view of the Z-slide, trolley and load toggle of FIG. 19.
Figure 23:
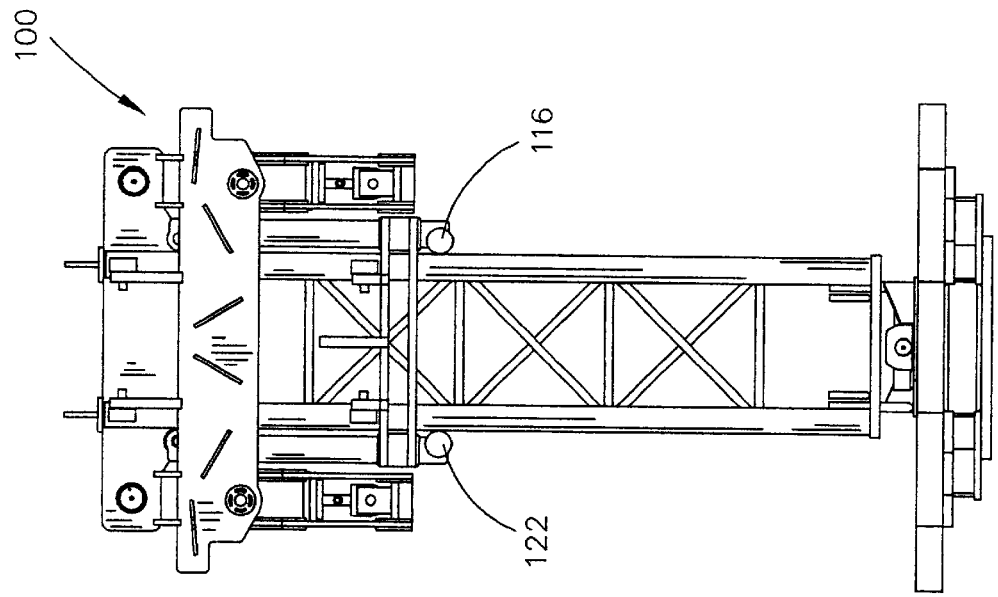
FIG. 23 is a front view of the Z-slide, trolley and load toggle of FIG. 19.
Figure 22:
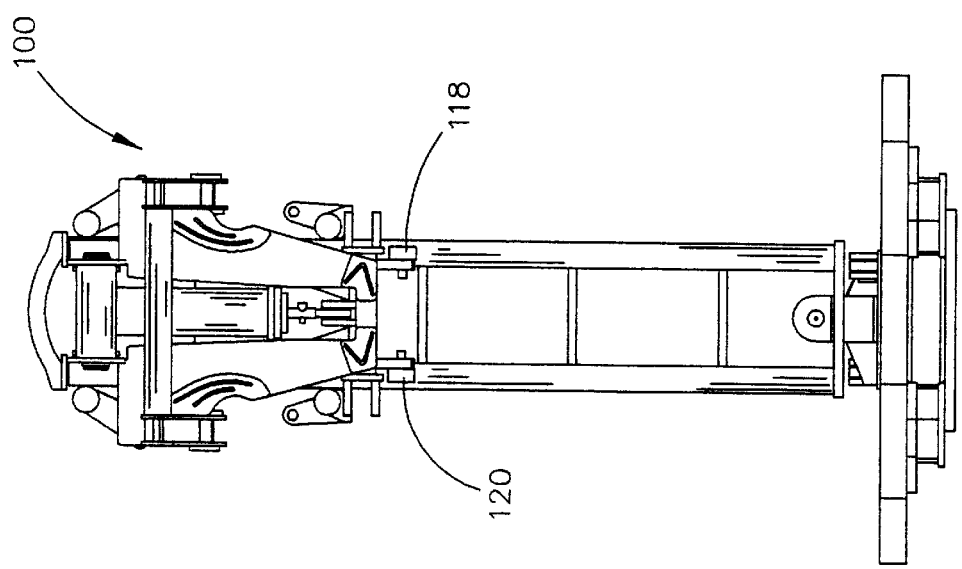
FIG. 22 is a side view of the Z-slide, trolley and load toggle of FIG. 19.
Figure 24:
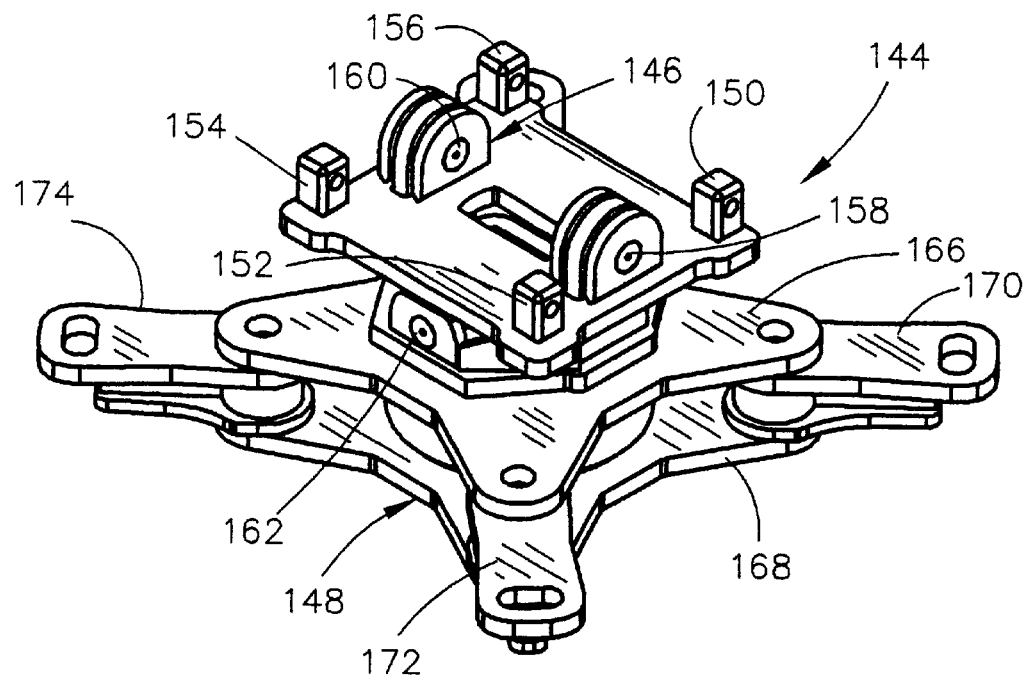
FIG. 24 is a top perspective view of the load toggle.
Figure 25:
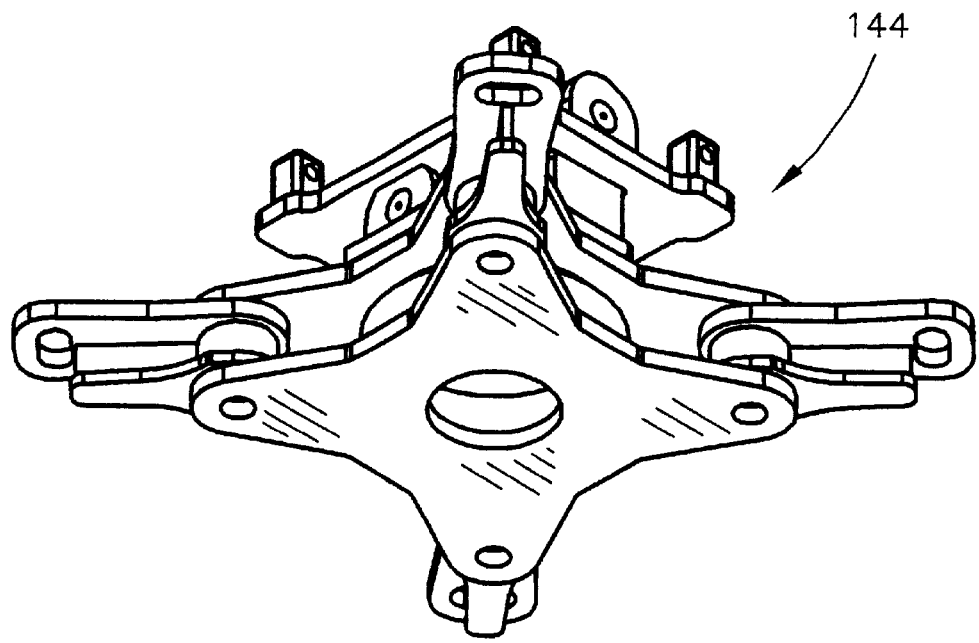
FIG. 25 is a bottom perspective view of the load toggle.
Figure 26:
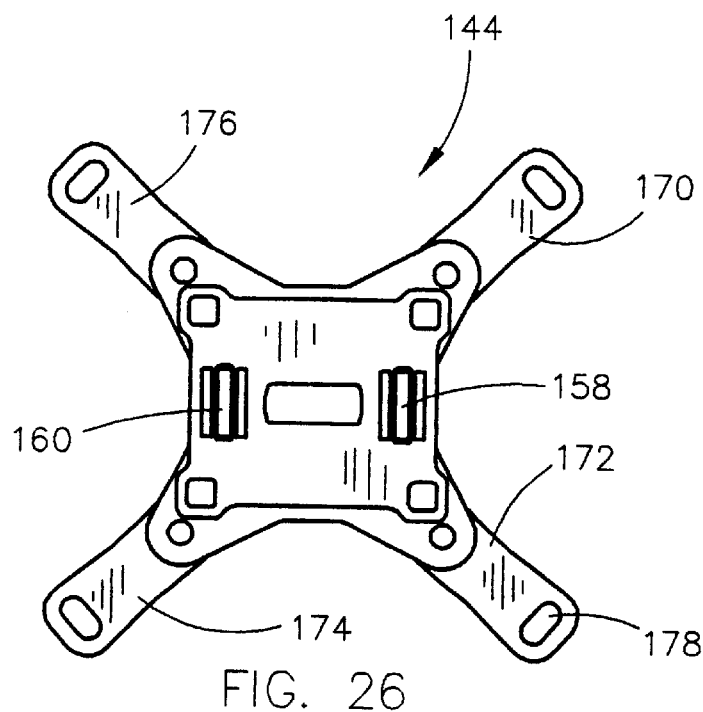
FIG. 26 is a top view of the load toggle.
Figure 27:
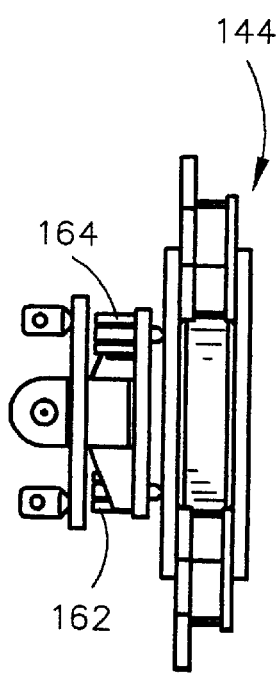
FIG. 27 is a side view of the load toggle.
Figure 28:
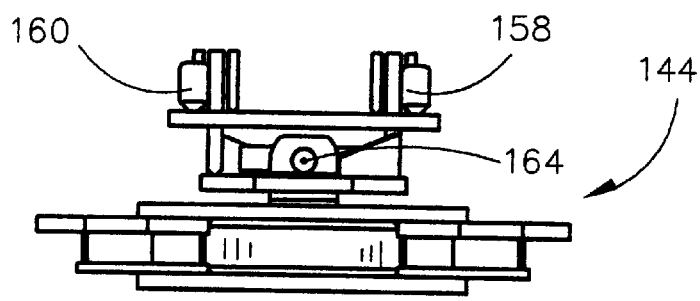
FIG. 28 is a side view of the load toggle.
Figure 29:
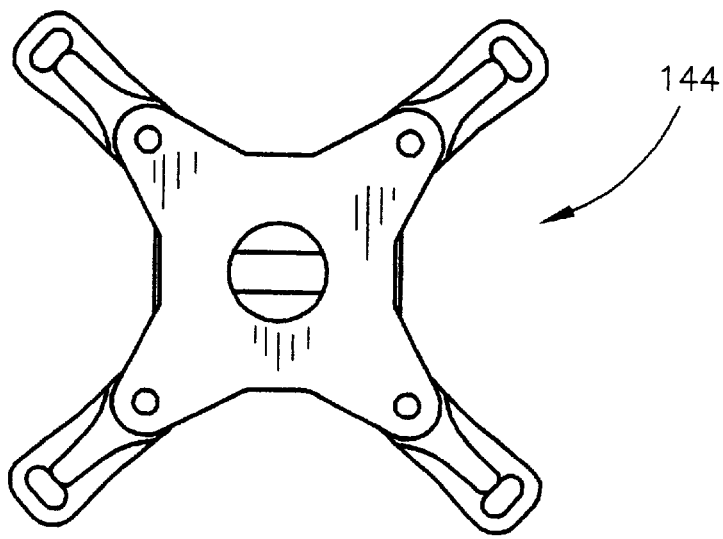
FIG. 29 is a bottom view of the load toggle.

A trolley 84 is movably mounted upon the upper ends of the beams of bridge 76 by means of four rollers 86 and moves in the X direction (side to side). As seen in FIG. 19, trolley 84 includes a pair of spaced-apart frame members 88 and 90 having a pair of frame members 92 and 94 secured to the ends thereof which extend therebetween. A pair of spaced-apart yokes 96 and 98 extend downwardly from frame members 88 and 90 at the ends thereof. A hydraulic cylinder (not shown) is secured to and extends between the bridge 76 and trolley 84 for moving trolley 84 with respect to bridge 76.

A Z-slide assembly 100 is selectively vertically movably mounted on trolley 84 for movement therewith. As seen in FIG. 19, Z-slide assembly 100 is positioned between frame members 88–90 and 92–94 for movement in the Z direction (vertical). Slide assembly 100 includes four vertically disposed posts or frame members 102, 104, 106 and 108 interconnected by braces 110. An arcuate brace 112 is secured to the upper ends of posts 102 and 104 and extends therebetween. Similarly, an arcuate brace 114 is secured to the upper ends of posts 106 and 108 and extends therebetween. Roller assemblies 116, 118, 120 and 122 are provided on trolley 84 which engage the posts 102, 104, 106 and 108, respectively. Trolley 84 is also provided with roller assemblies 124, 126, 128 and 130 which are also in engagement with posts 102, 104, 106 and 108, respectively. A hydraulic cylinder 132 has its base end (upper) connected to plates 134 and 136 at one end thereof by pin 138. Similarly, hydraulic cylinder 140 has its base end (upper) connected to plates 134 and 136 at the other end thereby by pin 142. The rod ends of hydraulic cylinders 132 and 140 are connected to yokes 96 and 98, respectively. Thus, extension of the cylinder rods of the cylinders 132 and 140 causes the Z-slide assembly to be moved upwardly with respect to bridge 76. Retraction of the cylinder rods within cylinders 132 and 140 causes the Z-slide assembly to move downwardly with respect to bridge 76. Preferably, the movement of the bridge, trolley and Z-slide assembly are remotely operated and controlled from ground level or from the tower by workers erecting the tower.

A load toggle or tower connection member 144 is secured to the lower end of Z-slide assembly 100 and includes a double gimble-type joint 146 at its upper end and a load spider 148 at its lower end. The joint 146 has four posts 150, 152, 154 and 156 extending upwardly therefrom which are received by and secured to the posts 102, 104, 106 and 108, respectively. Joint 146 includes a first gimble joint defined by pivot pins 158 and 160 and a second gimble joint defined by pivot pins 162 and 164. Load spider 148 includes vertically spaced plates 166 and 168 having four load arms 170, 172, 174 and 176 pivotally secured thereto and therebetween. The load arms 170, 172, 174 and 176 each have an elongated opening 178 formed therein for connection to the flange 180 which is secured to the upper end of the tower sections. The diameter of the plates 166 and 168 is less than the diameter of the opening 182 in flange 180 so that the load spider may pass through opening 182 when load arms 170, 172, 174 and 176 are folded inwardly. When the load spider 148 has been lowered through the opening 182 by the Z-slide assembly 100, the load arms 170, 172, 174 and 176 are pivoted outwardly beneath the lower surface of flange 180. The load arms are then bolted to the flange 180 to enable the bridge assembly to lift and transport the tower section as will be described hereinafter.

The numeral 184 refers to an attachment hanger which is used to selectively attach the upper block 186 to a tower section adjacent the upper end thereof. Attachment hanger 184 includes an angled support plate 188 which conforms to the exterior surface of the tower sections. Attachment pin 190 extends from the inner surface of plate 188 and is adapted to be received within an opening formed in each of the tower sections adjacent the upper end thereof. Bracket 192 is mounted on the exterior surface of plate 188 and has support arm 194 of block 186 pivotally secured thereto by pivot pin 196. The hoisting cable 28 of main winch 26 is threaded around upper block 186 and lower block 46 with the free end thereof being tied to the frame of the lower block 46 as previously described.

The method of assembly the tower erection device of this invention and the method of erecting the wind turbine tower or wind energy tower will now be described. A small crane is utilized to place the base tower section 10 on the foundation 12 with the base tower section being bolted to the foundation. The jack stands 34 of the jack stand assembly 32 are placed around the lower end of the base tower section 10 and are preferably chained together to prevent the tipping thereof. The skid or skid module 22 is then moved into place and bolted to the foundation so that the main winch 26 is in close proximity to the base tower section 10. The roll bank assemblies 49 on the lower cage 36 are opened and the lower cage 36 is lifted onto the jack stand by means of a small crane. The roll bank assemblies 49 on the lower cage 36 are moved into an operative engagement position with respect to the rails 14 and 16 on the opposite sides of the base tower section 10.

Side trusses 60 and 62 are secured to side panel 52 and side trusses 60' and 62' are secured to side panel 52'. One side panel-side truss assembly is secured to one side of the lower cage 36 so as to extend upwardly therefrom. The other side panel-side truss assembly is secured to the other side of the lower cage 36 so as to extend upwardly therefrom. The upper cage 64 is mounted on the upper ends of the side panels by means of a small crane and secured thereto. The attachment hanger 184 having the upper block 186 secured thereto is secured to the side of the base tower section 10 at the upper end thereof by inserting the connector pin 190 into the hole or opening provided in the upper end of the side wall of the base tower section 10. The hoisting cable 28 from the main winch 26 is threaded around the lower block 46 and the upper block 186 with the free end of the hoisting cable 28 attached to the frame of the lower block 46 so that movement of the hoisting cable 28 by the main winch 26 causes the lower cage 36 and the structure supported thereby to be moved vertically with respect to the base tower section 10.

Another tower section 10a is placed or staged on the staging platform 29 provided on the skid 22. The bridge assembly 70 is manipulated or moved on the upper cage 64 to position the load toggle 144 on the Z-slide assembly 100 so that the load arms 170, 172, 174 and 176 are positioned below the bottom surface of the upper flange 180 on the upper end of the base tower section 10. The load arms 170, 172, 174 and 176 are then pivotally moved outwardly and are connected to the flange 180 by bolts or the like. The main winch 26 is then operated to cause the hoisting cable 28 to raise the lower cage 36, upper cage 64, interconnecting frame assembly or structure 50 and bridge assembly 70 and the staged tower section 10a upwardly with respect to the base tower section 10. When the staged tower section 10a is raised sufficiently, the lower cage is pinned to the rails 14 and 16. The bridge assembly 70 is manipulated so that the staged tower section 10a is positioned over the base tower section 10 and is then lowered onto the base tower section 10. The lower end of the staged tower section 10a is bolted to the upper end of the base tower section 10. The auxiliary winch 82 on the bridge assembly 70 is operated to raise the attachment hanger 184 and upper block 186 from the upper end of the base tower section 10, after it has been disconnected from the base tower section 10, to the upper end of the staged tower section 10a mounted thereon. The attachment hanger 184 is then secured to the staged tower section 10a mounted on the base tower section 10. The lower cage 36 is unpinned from the rails 14 and 16 and is moved downwardly by the hoisting cable 28 of the main winch 26 until the lower cage 36 rests upon the jack stand assembly 32.

The bridge assembly is then again manipulated to position the load spider 148 of load toggle 144 within the open upper end of another tower section 10b on the staging platform. The necessary steps described above are repeated until the wind energy tower is completely erected. The auxiliary winch is then used to lower the upper block 186 to the ground after it has been removed from the erected tower. The bridge assembly, upper cage, side panels and side trusses, lower cage and jack stand are then removed from the erected tower. The skid module is then removed from the foundation 12.

The tower erection device may then be moved to another location for use in erecting another tower. It can be seen that the tower erection device of this invention is convenient and safe to use and permits the erection of a wind energy tower without the use of a large crane which is expensive and which is hazardous in certain weather conditions.

Thus it can be seen that the invention accomplishes at least all of its stated objectives.

I claim:

1. A wind energy tower erecting device for erecting tower sections upon a base tower section extending upwardly from a foundation, comprising in combination:
   a power source;
   a main winch powered by said power source and having a hoisting cable extending therefrom;
   a tower section staging platform;
   said tower section staging platform adapted to successively support a vertically disposed tower section thereon;
   a lower cage adapted to be initially positioned at least partially around the base tower section;
   a lower block secured to said lower cage adapted to receive the hoisting cable therearound;
   an upper cage spaced above said lower cage;
   a supporting frame structure interconnecting said lower and upper cages;
   an upper block initially attached to said base tower section adjacent the upper end thereof and adapted to be successively attached to the upper ends of tower sections as they are erected upon the base tower section;
   said hoisting cable also extending around said upper block;
   a bridge assembly mounted on said upper cage and having a tower section connector movably mounted thereon;
   said lower cage, supporting frame structure, upper cage and bridge assembly being movable by said hoisting cable of said main winch between said upper and lower positions with respect to the erected tower sections;
   said tower section connector being selectively movable in X, Y and Z directions;
   said tower section connector being selectively connectable to the upper end of a tower section positioned on said tower section staging platform when said lower cage, supporting frame structure, upper cage and bridge assembly are in their said lower position;
   said bridge assembly being connected to said tower section connector so that said tower section connector may be selectively moved, in either the X, Y and Z directions, with respect to said upper cage to position the tower section, connected to said tower section connector, upon an erected tower section.

2. The device of claim 1 further including an auxiliary winch on said bridge assembly for selectively moving said upper block from one tower section to another and for lowering said upper block to the ground at the conclusion of a tower erection.

3. The device of claim 1 further including a jack stand which is at least partially positioned around the base tower section for supporting said lower cage at a position above the foundation.

4. The device of claim 1 wherein said supporting frame structure includes at least two side panels extending between said upper and lower cages.

5. The device of claim 4 wherein said side panels are selectively removably connected to said upper and lower cages.

6. The device of claim 4 further including a side truss connected to each of said side panels.

7. The device of claim 6 wherein said side trusses are selectively removably secured to said side panels and wherein said side panels are selectively removably secured to said upper and lower cages.

8. The device of claim 2 further including an auxiliary power source on said bridge assembly for powering said movable components and said auxiliary winch.

9. The device of claim 1 wherein said tower sections have a pair of spaced-apart, vertically disposed rails provided thereon; said lower cage being vertically movably mounted on said rails.

10. The device of claim 9 wherein said lower cage includes rollers which are movable into engagement with said rails.

11. The device of claim 9 wherein each of said rails have vertically spaced openings formed therein adapted to receive pins therein to selectively lock said lower cage against vertical movement with respect to said rails.

12. The structure of claim 1 wherein said movable components of said bridge assembly comprises a bridge which is movably mounted in the Y direction on said upper cage, a trolley movably mounted on said bridge in the X direction, and a slide which is movably mounted on said trolley in the Z direction.

13. The structure of claim 12 wherein a hydraulic cylinder means is connected to said bridge for moving said bridge in the Y direction with respect to said upper cage.

14. The structure of claim 12 wherein a hydraulic cylinder means is connected to said trolley for moving said trolley in the X direction with respect to said upper cage.

15. The structure of claim 12 wherein a hydraulic cylinder means is connected to said slide for moving said slide in the Z direction with respect to said upper cage.

16. The structure of claim 15 wherein said tower section connector is secured to said slide.

17. The structure of claim 1 wherein said tower section connector comprises a load toggle.

18. The structure of claim 17 wherein said load toggle comprises a double gimble-type joint and a load spider.

19. The structure of claim 18 wherein said load spider comprises a plurality of selectively rotatable load arms which are adapted to be secured to the upper end of the tower section being transported.

20. The structure of claim 19 wherein the tower sections have inwardly extending flanges at their upper ends and wherein said load arms are selectively secured to the flange on the tower being transported.

21. The method of erecting a wind energy tower, comprising the steps of:
 (1) vertically positioning a base tower section, having at least a pair of rails thereon, on a foundation;
 (2) positioning a module including a power source, a main winch with hoisting cable and a tower section staging platform adjacent the base tower section;
 (3) positioning a jack stand at least partially around the base tower section;
 (4) mounting a lower cage on the jack stand including a lower block;
 (5) securing the lower cage to the rails on the base tower section;
 (6) securing an upper cage to the lower cage by an interconnecting frame structure;
 (7) mounting a bridge assembly including an auxiliary winch and a connector which is movable in the X, Y and Z directions on the upper cage;
 (8) securing an upper block to the base tower section;
 (9) connecting the hoisting cable to the upper and lower blocks;
 (10) positioning another tower section, having rails thereon, on the staging platform;
 (11) positioning the connector over the upper end of the staged tower section;
 (12) securing the connector to the upper end of the staged tower section;
 (13) operating the main winch so that the hoisting cable raises the lower cage and associated structure from a first lower position to a second upper position with respect to the base tower section whereby the staged tower section is raised from the staging platform so that he lower end of the staged tower section is positioned laterally of and above the upper end of the base tower section;
 (14) locking the lower cage in its second upper position;
 (15) operating the movable components on the bridge assembly to position the staged tower section on the upper end of the base tower section;
 (16) securing the lower end of the staged tower section to the upper end of the base tower section;
 (17) attaching the winch cable of the auxiliary winch to the upper block which is mounted on the base tower section;
 (18) disconnecting the upper block from the base tower section;
 (19) raising the disconnected upper block by means of the auxiliary winch;
 (20) securing the upper block to the staged tower section mounted on the base tower section;
 (21) unlocking the lower cage from the base tower section;
 (22) lowering the lower cage onto the jack stand;
 (23) connecting the connector to another tower section staged on the staging platform;
 (24) repeating the necessary steps set forth above until the tower is erected;
 (25) attaching the winch cable of the auxiliary winch to the upper block if not already attached;
 (26) disconnecting the upper block from the tower;
 (27) lowering the upper block to the ground.

22. The method of claim 21 further including the step of removing the lower cage, interconnecting frame structure, upper cage, bridge assembly and jack stand from the erected tower.

23. The method of claim 21 wherein the lower cage is locked onto the rails of the tower section by removable pins.

24. The method of claim 21 wherein the connector is secured to the staged tower sections by a plurality of pivotal arms which are secured to a flange at the upper ends of the staged tower sections.

25. The method of erecting a wind energy tower, comprising the steps of:
 (1) vertically positioning a base tower section, having at least a pair of rails thereon, on a foundation;
 (2) positioning a module including a power source, a main winch with hoisting cable and a tower section staging platform adjacent the base tower section;

(3) securing a lower cage to the rails on the base tower section;

(4) securing an upper cage to the lower cage by an interconnecting frame structure;

(5) mounting a bridge assembly including an auxiliary winch and a connector which is movable in the X, Y and Z directions on the upper cage;

(6) securing an upper block to the base tower section;

(7) connecting the hoisting cable to the upper and lower blocks;

(8) positioning another tower section, having rails thereon, on the staging platform;

(9) positioning the connector over the upper end of the staged tower section;

(10) securing the connector to the upper end of the staged tower section;

(11) operating the main winch so that the hoisting cable raises the lower cage and associated structure from a first lower position to a second upper position with respect to the base tower section whereby the staged tower section is raised from the staging platform so that he lower end of the staged tower section is positioned laterally of and above the upper end of the base tower section;

(12) locking the lower cage in its second upper position;

(13) operating the movable components on the bridge assembly to position the staged tower section on the upper end of the base tower section;

(14) securing the lower end of the staged tower section to the upper end of the base tower section;

(15) attaching the winch cable of the auxiliary winch to the upper block which is mounted on the base tower section;

(16) disconnecting the upper block from the base tower section;

(17) raising the disconnected upper block by means of the auxiliary winch;

(18) securing the upper block to the staged tower section mounted on the base tower section;

(19) unlocking the lower cage from the base tower section;

(20) lowering the lower cage to the lower end of the base tower section;

(21) connecting the connector to another tower section staged on the staging platform;

(22) repeating the necessary steps set forth above until the tower is erected;

(23) attaching the winch cable of the auxiliary winch to the upper block if not already attached;

(24) disconnecting the upper block from the tower;

(25) lowering the upper block to the ground.

* * * * *